United States Patent
Taylor et al.

(10) Patent No.: US 11,620,886 B2
(45) Date of Patent: Apr. 4, 2023

(54) MERCHANDISE SECURITY SYSTEM WITH INDUCTIVE CHARGING

(71) Applicant: InVue Security Products Inc., Charlotte, NC (US)

(72) Inventors: Gary A. Taylor, Fort Mill, SC (US); David N. Berglund, Indian Trail, NC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

(21) Appl. No.: 16/970,744

(22) PCT Filed: Feb. 15, 2019

(86) PCT No.: PCT/US2019/018191
§ 371 (c)(1),
(2) Date: Aug. 18, 2020

(87) PCT Pub. No.: WO2019/161178
PCT Pub. Date: Aug. 22, 2019

(65) Prior Publication Data
US 2020/0372770 A1    Nov. 26, 2020

Related U.S. Application Data

(60) Provisional application No. 62/632,229, filed on Feb. 19, 2018.

(51) Int. Cl.
*G08B 13/14*    (2006.01)
(52) U.S. Cl.
CPC ................. *G08B 13/1418* (2013.01)
(58) Field of Classification Search
CPC ............... G08B 13/1418; H02J 50/10
(Continued)

(56) References Cited

U.S. PATENT DOCUMENTS 5,633,575 A    5/1997    Gali
8,558,688 B2   10/2013   Henson et al.
(Continued)

FOREIGN PATENT DOCUMENTS

WO    2015138650 A1    12/2015

OTHER PUBLICATIONS

International Search Report and Written Opinion from corresponding International Application No. PCT/US2019/018191, dated Apr. 30, 2019 (12 pages).

(Continued)

*Primary Examiner* — John A Tweel, Jr.
(74) *Attorney, Agent, or Firm* — InVue Security Products Inc.

(57) ABSTRACT

Embodiments of the present invention are directed to security systems for securing an item of merchandise from theft or unauthorized removal. For example, the security system may include a sensor configured to be coupled to the item of merchandise and a base configured to removably support the sensor and the item of merchandise thereon. The sensor includes at least one electrical contact and an inductive coil, and the base includes at least one electrical contact and driving electronics for the inductive coil. The sensor is configured to transfer power inductively to the item of merchandise when the at least one electrical contact of the sensor contacts the at least one electrical contact of the base to thereby allow the driving electronics to energize the inductive coil, wherein the sensor is configured to cease transferring power to the item of merchandise when the sensor is lifted off of the base.

24 Claims, 3 Drawing Sheets

(58) Field of Classification Search
USPC .................................................... 340/568.2
See application file for complete search history.

(56) References Cited

U.S. PATENT DOCUMENTS

| | | |
|---|---|---|
| 8,575,944 B2 | 11/2013 | Dorairaj et al. |
| 8,749,194 B1 | 6/2014 | Kelsch et al. |
| 9,269,247 B2 | 2/2016 | Fawcett et al. |
| 9,396,631 B2 | 7/2016 | Fawcett et al. |
| 9,443,404 B2 * | 9/2016 | Grant ................. G08B 13/1445 |
| 9,730,285 B2 | 8/2017 | Lena et al. |
| 2009/0212638 A1 | 8/2009 | Johnson |
| 2010/0176945 A1 * | 7/2010 | Fawcett ............. G08B 13/1445 340/568.1 |
| 2015/0235533 A1 | 8/2015 | Grant et al. |
| 2016/0284179 A1 | 9/2016 | Schultz et al. |
| 2018/0197389 A1 | 7/2018 | Grant et al. |

OTHER PUBLICATIONS

Extended European Search Report from corresponding European Application No. 19754296.2, dated Nov. 8, 2021 (9 pages).

* cited by examiner

MERCHANDISE SECURITY SYSTEM WITH INDUCTIVE CHARGING

CROSS REFERENCE TO RELATED APPLICATIONS

This application is a U.S. national phase entry of International Application No. PCT/US2019/018191, filed on Feb. 15, 2019, which is a non-provisional of and claims the benefit of priority to U.S. Provisional Application No. 62/632,229, filed on Feb. 19, 2018, the entire contents of which are hereby incorporated by reference.

BACKGROUND OF THE INVENTION

Embodiments of the present invention relate generally to security systems for protecting items of merchandise, such as consumer electronics products.

It is common practice for retailers to provide demonstration models of consumer electronics products, such as handheld devices, tablets, and laptop computers, so that a potential purchaser may examine the product more closely and test the operation of its features. A working demonstration model, however, increases the possibility that the demonstration model will be stolen or removed from the display area by an unauthorized person. As a result, demonstration models of consumer electronics products are typically protected by a security system that permits a potential purchaser to examine and operate the product, while reducing the likelihood that the demonstration model will be stolen or removed from the display area.

BRIEF SUMMARY

Embodiments of the present invention are directed to security systems for securing an item of merchandise from theft or unauthorized removal. In one embodiment, the security system includes a sensor configured to be coupled to the item of merchandise and a base configured to removably support the sensor and the item of merchandise thereon. The sensor includes at least one electrical contact and an inductive coil, and the base includes at least one electrical contact and driving electronics for the inductive coil. The sensor is configured to transfer power inductively to the item of merchandise when the at least one electrical contact of the sensor contacts the at least one electrical contact of the base to thereby allow the driving electronics to energize the inductive coil, wherein the sensor is configured to cease transferring power to the item of merchandise when the sensor is lifted off of the base.

In another embodiment, a security system is provided and includes an item of merchandise comprising an inductive coil. The security system also includes a sensor configured to be coupled to the item of merchandise, the sensor comprising at least one electrical contact and an inductive coil, and a base configured to removably support the sensor and the item of merchandise, the base comprising at least one electrical contact and driving electronics for the inductive coil of the sensor. The inductive coil of the sensor is configured to transfer power to the inductive coil of the item of merchandise when the at least one electrical contact of the sensor contacts the at least one electrical contact of the base to thereby allow the driving electronics to energize the inductive coil of the sensor. In addition, the sensor is configured to cease transferring power to the item of merchandise when the sensor is lifted off of the base.

In another embodiment, a method for securing an item of merchandise is provided. The method includes coupling a sensor to an item of merchandise, the sensor comprising at least one electrical contact and an inductive coil, and securing a base to a support surface, the base comprising at least one electrical contact and driving electronics for the inductive coil. The method further includes positioning the sensor on the base for providing power inductively to the item of merchandise when the at least one electrical contact of the sensor contacts the at least one electrical contact of the base to thereby allow the driving electronics to energize the inductive coil.

In another embodiment, a security system includes a sensor configured to be coupled to the item of merchandise, the sensor comprising an inductive coil, and a base configured to removably support the sensor and the item of merchandise, the base comprising driving electronics for the inductive coil. The driving electronics is configured to energize the inductive coil, and wherein the sensor is configured to transfer power inductively to the item of merchandise using the inductive coil.

In another embodiment, a security system includes a sensor configured to be coupled to the item of merchandise, the sensor comprising at least one electrical contact and an inductive coil, and a base configured to removably support the sensor and the item of merchandise, the base comprising at least one electrical contact. The security system also includes driving electronics for the inductive coil, wherein the sensor is configured to transfer power inductively to the item of merchandise when the at least one electrical contact of the sensor contacts the at least one electrical contact of the base to thereby allow the driving electronics to energize the inductive coil, and wherein the sensor is configured to cease transferring power to the item of merchandise when the sensor is lifted off of the base.

DETAILED DESCRIPTION OF EMBODIMENTS OF THE INVENTION

Figure 1:
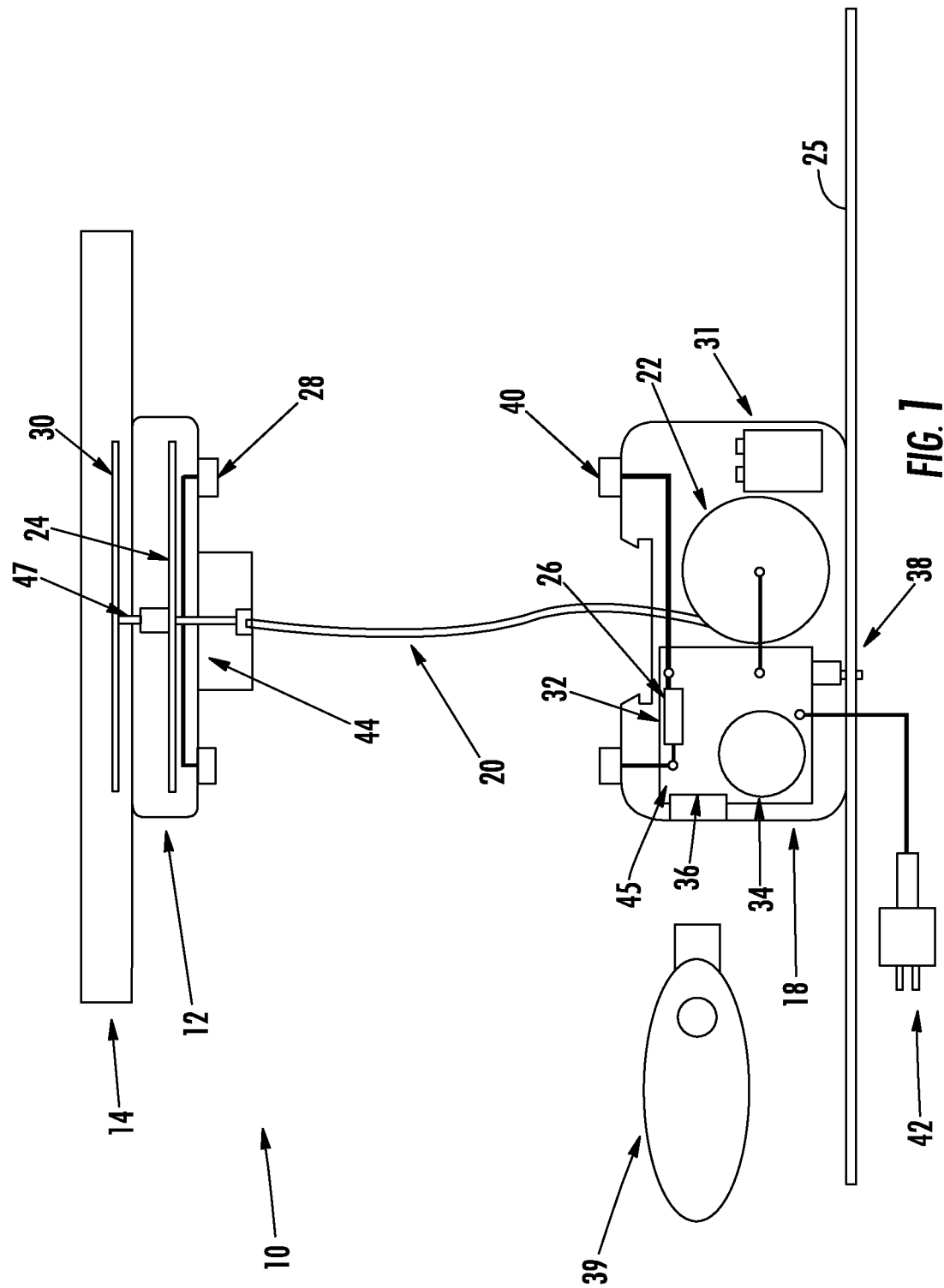
FIG. 1 is schematic of a security system according to one embodiment of the present invention.

Referring to the accompanying figures wherein identical reference numerals denote the same elements throughout the various views, embodiments of security systems according to the present invention for protecting an item of merchandise against theft or unauthorized removal are disclosed. The item of merchandise may be any item, including any number of consumer electronics products (e.g., hand-held device, cellular phone, smart phone, tablet, laptop computer, etc.). In some embodiments, the item of merchandise is capable of being charged inductively. The security systems described herein are operable for securing the item of merchandise against theft or authorized removal, while at the same time permitting a potential purchaser to closely examine and operate the item of merchandise in a display area. The security system permits a potential purchaser to examine and test the item of merchandise, while reducing the likelihood that the item of merchandise will be stolen or removed from the display area by an unauthorized person. The systems shown and described herein are suitable for securing an item of merchandise in a residential or commercial environment, as well as a retail environment, and furthermore, is not intended to be limited to use only as a security display device for protecting against theft and/or unauthorized removal.

According to one embodiment shown in FIG. 1, the security system 10 generally comprises a sensor 12 configured to be secured to an item of merchandise 14. The security system 10 may also include a base 18 that is configured to removably support the sensor 12 and the item of merchandise 14 thereon. In some embodiments, the base 18 and the sensor 12 include one or more contacts 28, 40 for facilitating inductive charging when the sensor is supported on the base. In addition, the security system 10 also includes a cable 20 that is secured to the sensor 12 at one end and operably engaged with a recoiler 22 at an opposite end. In one embodiment, a sense circuit or loop defined through the cable 20 may be electrically isolated from any charging circuit used to charge the sensor 12 and/or the item of merchandise 14. As such, the sense loop may be used to detect various security events associated with the cable 20, such as the cable being cut, shorted, and/or disconnected. The charging circuit allows for charging of the item of merchandise 14. The sensor 12 and/or the base 18 may detect security events associated with the sensor and/or the item of merchandise 14, such as the item of merchandise being removed from the sensor.

Figure 2:
FIG. 2 is a perspective view of a security system according to another embodiment of the present invention.
Figure 3:
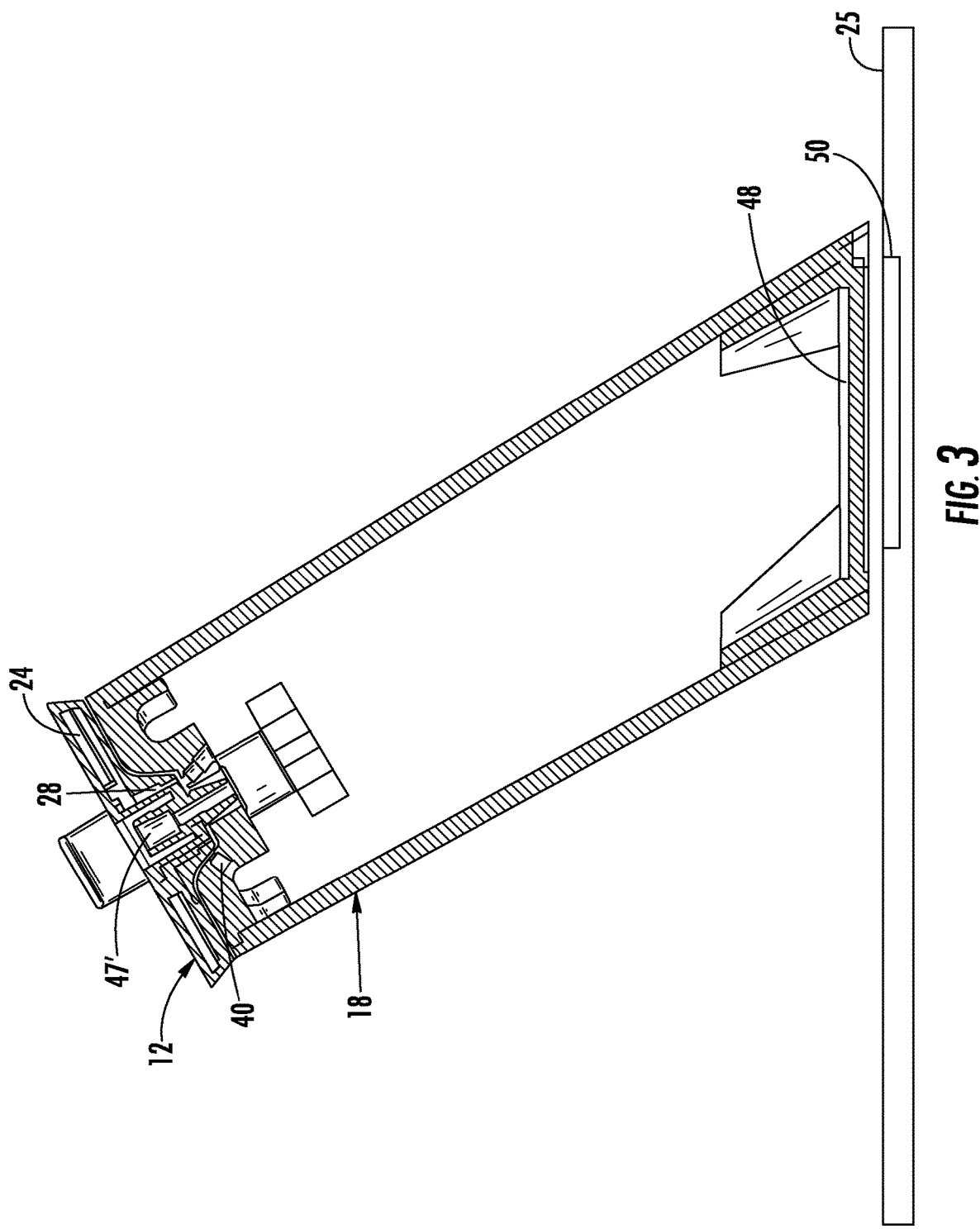
FIG. 3 is a cross-sectional view of the security system shown in FIG. 2.

The sensor 12 may be secured to the item of merchandise 14 using any desired technique, such as with an adhesive and/or mechanical brackets. For example, FIG. 2 shows that the sensor 12 may include mechanical brackets 33 for engaging the item of merchandise 14. The sensor 12 may include an inductive coil 24. As noted above, the sensor 12 may include one or more electrical contacts 28. In some embodiments, the sensor 12 includes a plurality of electrical contacts 28. The electrical contacts 28 may be in electrical communication with the inductive coil 24. The sensor 12 may also include an insulator (ferrite) positioned adjacent to the inductive coil 24 to facilitate power transfer to the item of merchandise 14. In some embodiments, the sensor 12 may not supply power to the item of merchandise 14 when the item is lifted from the base 18. Rather, the item of merchandise 14 may operate using its own power source when lifted from the base 18.

The base 18 may be configured to be supported on a support or display surface, such as a counter, shelf, fixture, or the like. Thus, the base 18 may be located entirely above the support surface, while in other embodiments, the base may be located below the support surface or positioned on both sides of the support surface. The base 18 may be secured to the support surface using any desired technique such as an adhesive and/or fasteners. The base 18 may include a recoiler 22 as discussed above. As such, the cable 20 may be extended from the base 18 when the sensor 12 and the item of merchandise 14 are lifted from the base, and the cable may be retracted into the base when the sensor and the item of merchandise are returned to the base. The recoiler 22 may be spring biased in some embodiments such that the cable 20 is automatically retracted within the base 18. Furthermore, the base 18 may include a PCB 32, circuitry, or the like that is in electrical communication with the cable 20. In this regard, the cable 20 may include one or more electrical conductors extending along the length of the cable. In some cases, the cable 20 may include a pair of conductors for defining a sense loop or circuit and conducting an electrical signal. In other cases, the cable 20 may include a single conductor, such as an optical conductor for conducting an optical signal (e.g., a fiber optic cable).

The base 18 may further include an alarm mechanism 34, such as a piezoelectric transducer, for generating an audible alarm in response to a security event. The base 18 may also include a battery 31 or power source that is in electrical communication with the PCB 32. The base 18 may include a port 36 that is configured to facilitate communication with a key 39. For example, the port 36 may facilitate wireless communication with a key 39 for arming or disarming the security system 10. In one embodiment, the key 39 is an infrared key configured to arm/disarm the alarm with a unique identifying code. In some embodiments, the key 39 is similar to the IR and IR2 keys manufactured by InVue Security Products Inc. The base 18 may include a switch 38 (e.g., a pressure or plunger switch) that is configured to detect when the base is removed from the support surface in an unauthorized manner. As such, the security system 10 may be a "standalone" system that is configured to detect various security events and configured to be supported on a display surface.

As discussed above, the base 18 may include one or more electrical contacts 40 and driving electronics 26 in electrical communication therewith. The PCB 32 may include the driving electronics 26 that is configured to energize the inductive coil 24. The driving electronics 26 may include an oscillator for generating the desired frequency and a power transistor for driving the inductive coil 24. The contacts 28, 40 of the base 18 and the sensor 12 are configured to align with one another and contact one another when the sensor is supported on the base. Thus, the base 18 and the sensor 12 are in electrical communication with one another when the sensor is supported on the base. The base 18 may be electrically connected to a power source 42 which is configured to provide power to the base and the driving electronics 26 (e.g., AC current). The power source 42 may include a connector at a free end (e.g., a USB or like plug). The base 18 may also include charging circuitry 45 that is configured to facilitate power transfer from the external power source 42 and the driving electronics 26. Thus, when the sensor 12 is supported on the base 18, the driving electronics 26 is electrically connected to the inductive coil 24 and is configured to energize the coil for transferring power to the item of merchandise 14. The item of merchandise 14 may include an inductive coil 30 (e.g., a secondary coil) that is configured to receive inductive power transferred from the inductive coil 24 (e.g., the primary coil). The inductive coil 24 may induce an electromagnetic field with the inductive coil 30 in the item of merchandise for facilitating power transfer. Therefore, the item of merchandise 14 may be powered by power transferred thereto and may be used to charge a battery associated with the item of merchandise. The inductive coil 24 and the driving electronics 26, which are typically packaged as a single unit, may be separated from one another and only in communication with one another when the electrical contacts 28, 40 are in contacting one another. It is understood that in some embodiments, the driving electronics 26 may be located in the sensor 12 rather than in the base 18. In this embodiment, the electrical contacts 28, 40 facilitate the transfer of power to the sensor 12 to facilitate the transfer of power inductively from the sensor to the item of merchandise 14.

In another embodiment, the base 18 may include an inductive coil 48 and the support surface may include an inductive coil 50. In this way, the inductive coil 50 may be configured to transfer power to the inductive coil 48 whereby the inductive coil 48 is configured to transfer all necessary power for the base 18, including transferring power to the sensor 12 as described above. Thus, in some cases, no cables are required to power the item of merchandise 14 and no holes are required in the support surface.

An end of cable 20 may be mechanically secured to the sensor 12. Thus, the cable 20 may not be electrically connected to the sensor 12 in any way, and the conductors in the cable may be electrically isolated from the power transmitted to the sensor and the item of merchandise 14. In one example, the cable 20 may be attached to the sensor 12 with a swivel 44 or like connector (e.g., an audio jack connector) to allow for rotational movement between the sensor and the cable. The swivel 44 could be permanently attached to the sensor 12 or could be removably attached if desired. However, in other embodiments, the cable 20 may transmit power to the sensor using one or more conductors, such as for powering the driving electronics 26.

It is understood that the cable 20 may be any suitable cord, tether, or the like. In addition, the cable 20 may include one or more electrical conductors for transmitting electrical, security, and/or communication signals. In addition, the cable 20 may be a single strand, multi-strand, or braided. The cable 20 may be flexible to facilitate extension and retraction with the base 18, and in some embodiments, may be formed of a cut-resistant material. Furthermore, the cable 20 may have various cross sections, such as round or flat. In some embodiments, the security system 10 may not include a recoiler 22. Thus, the cable 20 could be a straight or coiled cable that is secured to the sensor 12 at one end and electrically connected to base 18 at an opposite end.

Various sensing techniques may be employed for determining whether the cable 20 has been cut or removed from the sensor 12 in an unauthorized manner. For example, the cable 20 may include a pair of electrical conductors that define a sense loop therethrough. Thus, should the sense loop be interrupted (e.g., by cutting or shorting the cable 20), the PCB 32 in the base 18 may detect the interruption and generate an alarm signal.

The sensor 12 may include a pressure switch 47 that is configured to operably engage the item of merchandise 14. For instance, the sensor 12 may include a pressure switch 47 that is configured to engage the item of merchandise 14 when the sensor is secured to the item of merchandise. The pressure switch 47 may be electrically connected to cable 20 and the base's PCB 32 such that should the item of merchandise 14 be removed in an unauthorized manner, the base 18 may detect the removal and be configured to generate an alarm signal. The pressure switch 47 may be electrically connected to the one or more conductors in the cable 20 so as to be part of the same sense loop. In some embodiments, the pressure switch 47 may be electrically isolated from the charging circuit, as the pressure switch may be a mechanical engagement with the item of merchandise 14 only.

In another embodiment, the end of the cable 20 may include a pressure switch 47'. In this regard, the end of the cable 20 may include a pressure switch 47' that is configured to directly engage the item of merchandise 14. In some cases, the pressure switch may also be configured to swivel relative to the item of merchandise 14. The swivel switch 47' may be configured to engage the item of merchandise 14 directly to thereby detect the presence of the item of merchandise. In some embodiments, the pressure or swivel switch may be similar to that disclosed in U.S. application Ser. No. 15/742,291, filed on Jan. 5, 2018, entitled Merchandise Security Systems, the contents of which are incorporated herein in their entirety.

Therefore, embodiments of the present invention may provide several advantages. Because the cable 20 does not require conductors for transferring power, the cable may only require one or two conductors, which reduces the overall diameter of the cable. Moreover, by separating the inductive coil 24 from the driving electronics 26, the size of the sensor 12 may be smaller than if both were required to be housed within the sensor.

The foregoing has described one or more embodiments of security systems for securing an item of merchandise from theft or unauthorized removal. Although various embodiments of the present invention have been shown and described, it will be apparent to those skilled in the art that various modifications thereto can be made without departing from the spirit and scope of the invention. Accordingly, the foregoing description is provided for the purpose of illustration only, and not for the purpose of limitation.

That which is claimed is:

1. A security system comprising:
a sensor configured to be coupled to the item of merchandise, the sensor comprising at least one electrical contact and an inductive coil;
a base configured to removably support the sensor and the item of merchandise, the base comprising at least one electrical contact;
driving electronics for the inductive coil of the sensor, wherein the base comprises the driving electronics;
a power source; and
charging circuitry for transferring power from the power source to the driving electronics,
wherein the sensor is configured to transfer power inductively to the item of merchandise when the at least one electrical contact of the sensor contacts the at least one electrical contact of the base to thereby allow the driving electronics to energize the inductive coil, and wherein the sensor is configured to cease transferring power to the item of merchandise when the sensor is lifted off of the base.

2. The security system of claim 1, wherein the base is configured to detect removal of the item of merchandise from the sensor.

3. The security system of claim 1, further comprising a key configured to wirelessly communicate with the base for arming or disarming an alarm.

4. The security system of claim 1, further comprising a cable coupled to the sensor and defining a sense loop for detecting a security event.

5. The security system of claim 4, further comprising an alarm operably engaged with the base configured to generate an alarm signal when the item of merchandise is removed from the sensor or the sense loop is interrupted.

6. The security system of claim 4, further comprising a recoiler connected to the cable.

7. The security system of claim 4, wherein the security event comprises the cable being cut, shorted, and/or disconnected.

8. The security system of claim 4, wherein the cable is coupled to the sensor and the base.

9. The security system of claim 4, wherein the cable is coupled to the sensor at one end and coupled to the base at an opposite end.

10. The security system of claim 4, wherein the cable does not transmit power to the item of merchandise.

11. The security system of claim 4, wherein the cable comprises at least one conductor for defining the sense loop.

12. The security system of claim 1, wherein the base comprises a printed circuit board, and wherein the printed circuit board comprises the driving electronics.

13. The security system of claim 1, wherein the driving electronics comprises an oscillator for generating a frequency and a power transistor for driving the inductive coil of the sensor.

14. The security system of claim 1, wherein the base is configured to receive power inductively from the support surface and transfer the power to the sensor.

15. The security system of claim 1, wherein no cables are required to power the item of merchandise.

16. The security system of claim 1, wherein the driving electronics and the inductive coil are only able to communicate with one another when the at least one electrical contact of the sensor contacts the at least one electrical contact of the base.

17. A method for securing an item of merchandise, comprising:
    coupling a sensor to an item of merchandise, the sensor comprising at least one electrical contact and an inductive coil;
    securing a base to a support surface, the base comprising at least one electrical contact, the base comprising driving electronics for the inductive coil and charging circuitry for transferring power from a power source to the driving electronics; and
    positioning the sensor on the base for providing power inductively to the item of merchandise when the at least one electrical contact of the sensor contacts the at least one electrical contact of the base to thereby allow the driving electronics to energize the inductive coil.

18. The method of claim 17, further comprising coupling a cable to the sensor for defining a sense loop for detecting a security event.

19. The method of claim 17, wherein securing comprises securing the base to the support surface such that the support surface is configured to transfer power inductively to the base.

20. A security system comprising:
    a sensor configured to be coupled to the item of merchandise, the sensor comprising at least one electrical contact and an inductive coil; and
    a base configured to removably support the sensor and the item of merchandise, the base comprising at least one electrical contact and driving electronics for the inductive coil, the base further comprising charging circuitry for transferring power to the driving electronics,
    wherein the sensor is configured to transfer power inductively to the item of merchandise when the at least one electrical contact of the sensor contacts the at least one electrical contact of the base to thereby allow the driving electronics to energize the inductive coil, and wherein the sensor is configured to cease transferring power to the item of merchandise when the sensor is lifted off of the base.

21. The security system of claim 20, further comprising a cable coupled to the sensor and the base, the cable defining a sense loop for detecting a security event.

22. The security system of claim 20, wherein the base comprises a printed circuit board, and wherein the printed circuit board comprises the driving electronics.

23. The security system of claim 20, wherein the driving electronics comprises an oscillator for generating a frequency and a power transistor for driving the inductive coil of the sensor.

24. The security system of claim 20, wherein the driving electronics and the inductive coil are only able to communicate with one another when the at least one electrical contact of the sensor contacts the at least one electrical contact of the base.

* * * * *